United States Patent [19]

Carter

[11] 4,073,388
[45] Feb. 14, 1978

[54] SEMI-AUTOMATIC LIFTING SYSTEM

[75] Inventor: Norman R. Carter, Bossier City, La.

[73] Assignee: Zetco Manufacturing Company, Incorporated, Shreveport, La.

[21] Appl. No.: 760,133

[22] Filed: Jan. 6, 1977

[51] Int. Cl.² .............................................. B65G 59/02
[52] U.S. Cl. .................................... 214/8.5 A; 214/89
[58] Field of Search ............... 214/75 R, 8.5 R, 11 R, 214/16.4 R, 83.1, 89, 8.5 A

[56] References Cited

U.S. PATENT DOCUMENTS

| Re. 26,906 | 6/1970 | Barker | 214/16.4 R X |
|---|---|---|---|
| 3,142,389 | 7/1964 | Bolt | 214/8.5 R X |
| 3,249,242 | 5/1966 | Zachow | 214/8.5 R X |
| 3,348,359 | 10/1967 | Lasbrey | 214/11 R X |
| 3,520,427 | 7/1970 | Offen | 214/75 R |

Primary Examiner—Albert J. Makay

Attorney, Agent, or Firm—Clarence A. O'Brien; Harvey B. Jacobson

[57] ABSTRACT

A semi-automatic lifting device for operation by a single operator for complete control over the operation of raising pallets loaded with cases of empty bottles and the like. At least one work station is provided, but preferably two such stations with the operator located centrally therebetween, with foot controls at the operator's position for operation of hydraulic or other power-type lifts for each work station. The pallets loaded with cases of bottles are lifted to a convenient height for the operator who then may transfer the cases to an adjacent associated conveyor system by the operator simply sliding the cases of bottles onto the case conveyor, thereby, eliminating most bottle breakage and manual lifting of the cases. The system will increase productivity and decrease chances of back injuries by eliminating case and bottle lifting.

5 Claims, 8 Drawing Figures

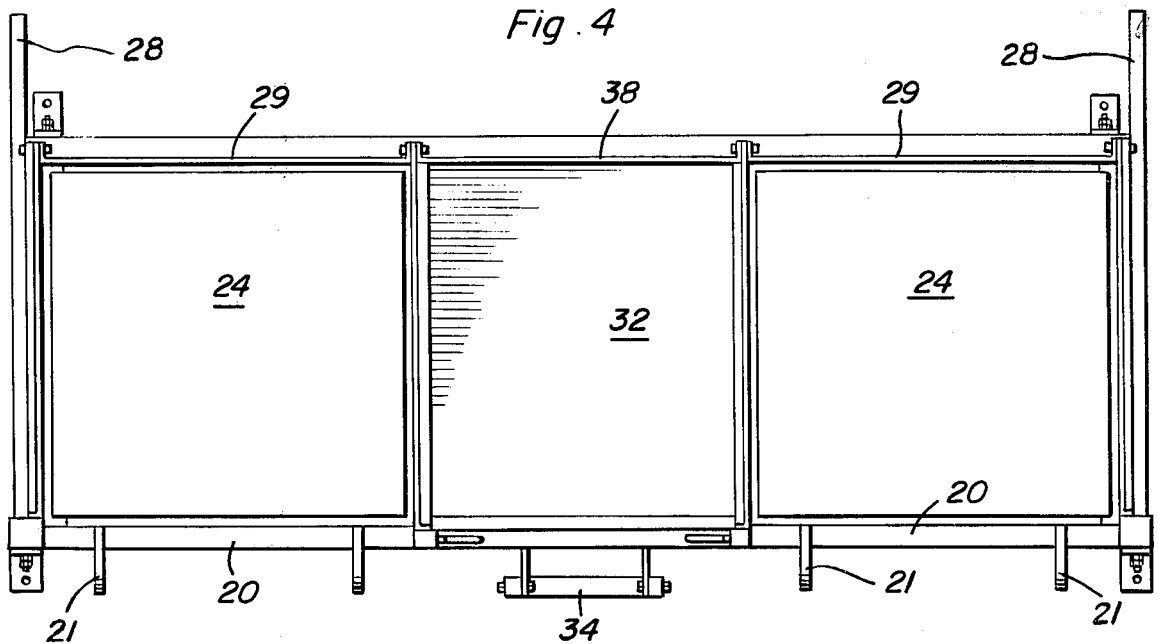
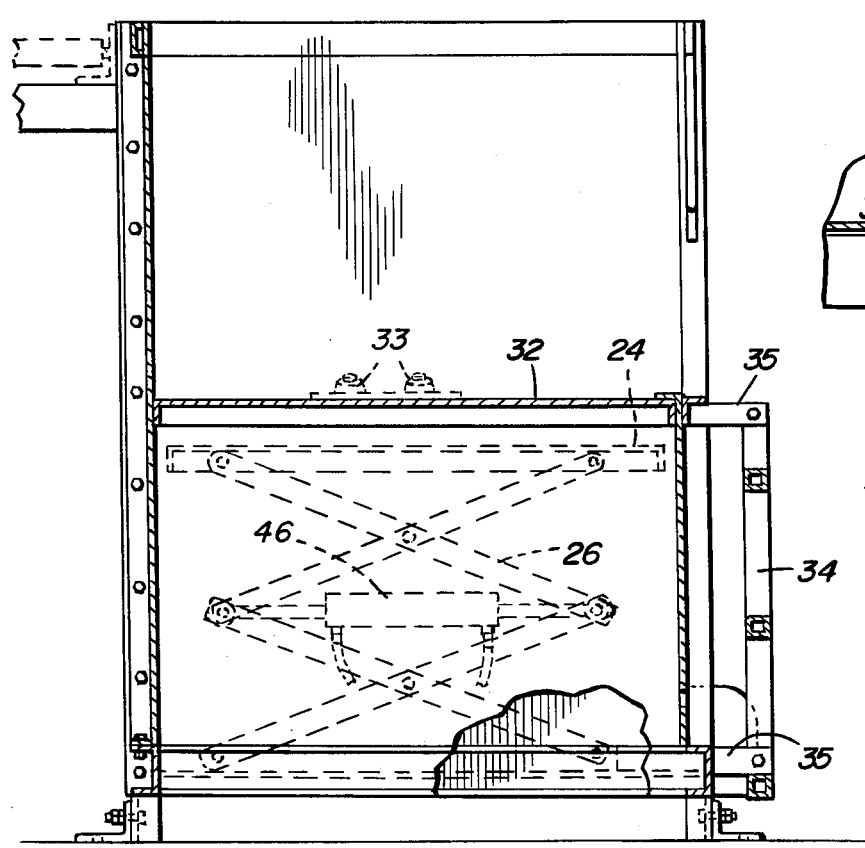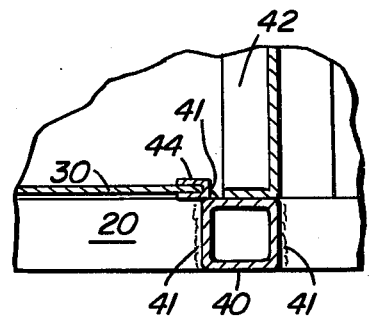

SEMI-AUTOMATIC LIFTING SYSTEM

BACKGROUND OF THE INVENTION

1. Field of the Invention

This invention relates generally to devices for lifting pallets of cases loaded with empty bottles and the like under the control of an operator and for the purpose of eliminating bottle breakage and reducing the manual effort required of said operator.

2. Description of the Prior Art

A common problem with know-type devices for unloading pallets loaded with bottles and the like is that these devices are not arranged for easy control by a single operator, nor are they easily operated by foot controls by the operator.

Another problem with know-type devices is that they are not arranged so that the pallets of cases of empty bottles may be mechanically loaded prior to the operation of the overall structure.

Know prior art patents which may be peritnent to this invention are as follows:

| | |
|---|---|
| 3,402,830 | Sept. 24, 1968 |
| 3,488,065 | Dec. 9, 1969 |
| 3,624,782 | Nov. 30, 1971 |
| 3,782,562 | Jan. 1, 1974 |

None of these prior art devices offers the new and unique features of the invention disclosed herein.

SUMMARY OF THE INVENTION

An object of the present invention is to provide a semi-automatic lifting device which may be controlled by a single operator for increasing overall productivity and still reducing physical strain, or possible injury to said operator.

Another object of the present invention is to provide a lifting device having two work stations for holding the pallets loaded with cases of empty bottles or the like and arranged with a work station for a single operator between the two pellet stations. This permits a single operator to handle both stations and virtually doubles the productivity achieved by the one-man operation thereof.

A further object of this invention is to provide a lifting device which is constructed for easy installation, will accommodate speeds up to 550 bottles per minute, requires a minimum of floor space, is simple to operate and relatively trouble free, and of rugged construction.

A still further object of this invention is to provide a lifting device which has both right- and left-hand discharge positions, is arranged for convenient one-man operation, reduces glass breakage, eliminates the "man handling" of pallets by the operator, reduces fatigue of the operator, and increases the operator's efficiency as well as the overall efficiency of the entire operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is top plan view.

FIG. 5 is a cross-sectional view taken generally along lines 5—5 of FIG. 2.

FIG. 7 is a fragmentary cross-sectional view taken generally along line 7—7 of FIG. 2.

DESCRIPTION OF THE PREFERRED EMBODIMENT

Figure 1:
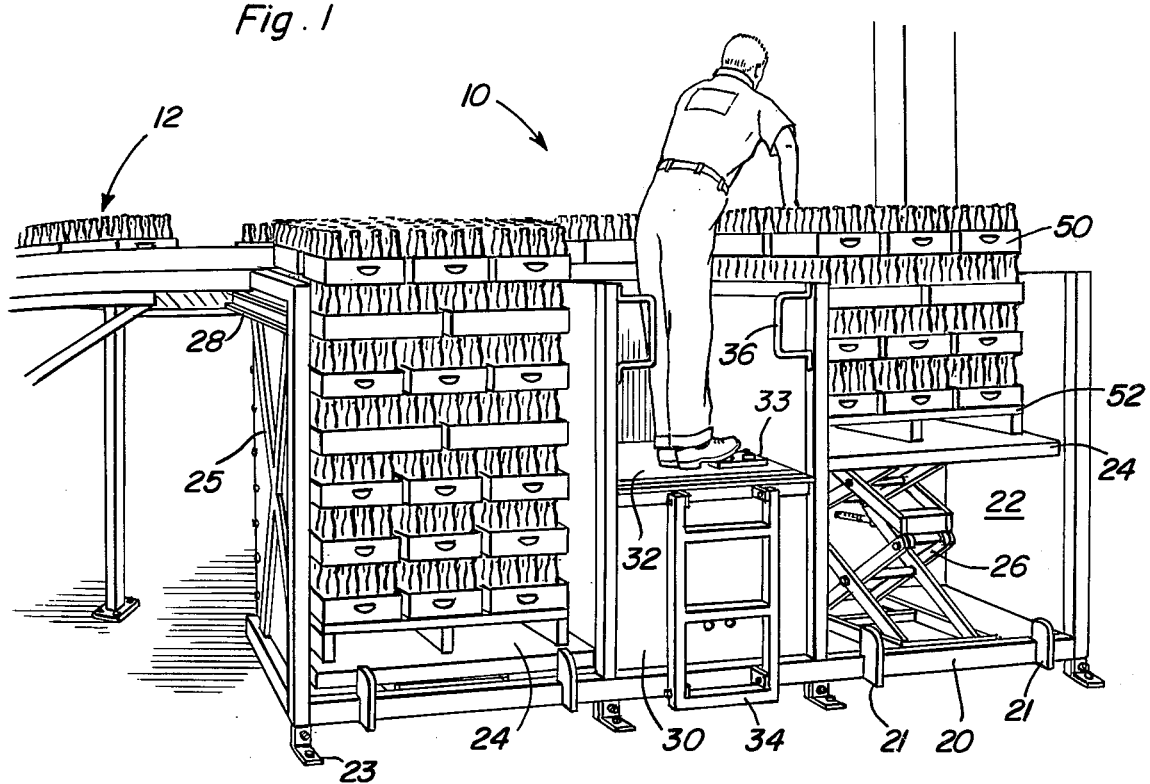
FIG. 1 is a perspective view of the device in operation.
Figure 6:
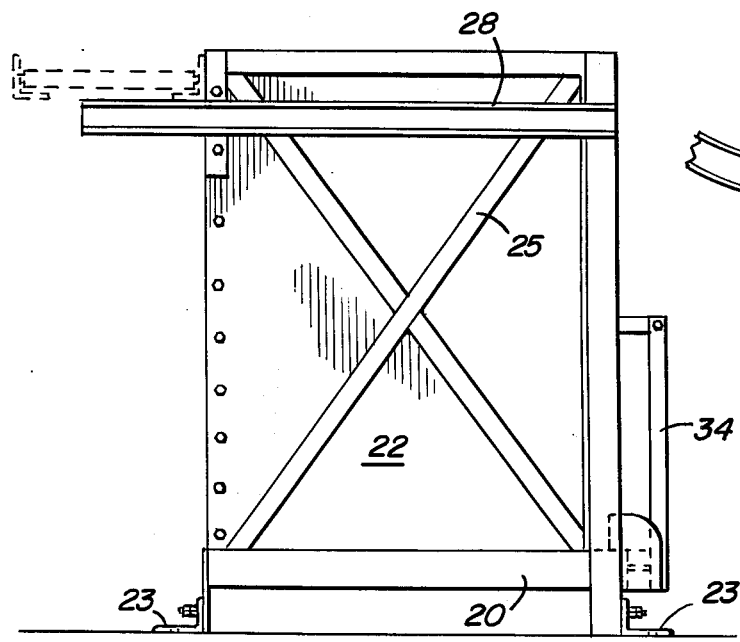
FIG. 6 is an end elevational view from the left of FIG. 2.

Referring to FIG. 1 of the drawings, reference numeral 10 indicates in general, the semi-automatic lifting device of this invention as in operation. An operator is shown standing at the work station between the two lifting platforms 24 for the pallets after being loaded with cases of bottles 50 when they are in the lowermost position, as seen in the left of the view of FIG. 1. A conveyor system, indicated by reference numeral 12, is provided adjacent the upper level of the support structure for reception of the cases of empty bottles as the operator pushes same off the upper row onto said conveyor.

Looking at FIGS. 1–6 of the drawings, the various structural elements of the device will be described in detail. A basic rectangular frame structure 20, of square or rectangular metal tube material, forms the lower support of the structure. Bumpers 21 are normally welded to the front member 20 for protection of the structure against forklift trucks and other devices used to unload the pallets into the structure. Side panels 22 are normally provided at each end, and lifting platforms 24 actuated by scissor-type lifting jacks 26 are provided in each of the work stations. As seen in FIG. 5, a hydraulic or fluid power cylinder 46 is normally connected to the scissor structure for effecting the lifting operation of the respective platforms 24. Cross or X members 25 brace the end structures and support the other rails of the frame. Mounted near the upper rails are channel bars 28 which for a guiding and supporting rails for the cases as they are unloaded onto the conveyor 12. Angle members 23 are normally welded or otherwise fastened to the lower support frame 20 for bolting to the floor of the establishment in which the device is installed.

As seen in FIG. 1, a raised work station which includes a front plate 30 and a floor 32 provided at the center portion of the structure for the operator of the device. Appropriate foot controls 33 are mounted on each side of the floor adjacent the respective jack and power cylinder on that side. Hand grips 36 also may be provided as well as a ladder structure 34. A back panel 38 protects the operator from the adjacent conveyor system and forms a substantially complete enclosure for the operator. Other back panels 29 enclose the pallet stations. As best seen in FIG. 5, the ladder 34 is supported by members 35 from the basic frame of the device.

Figure 2:
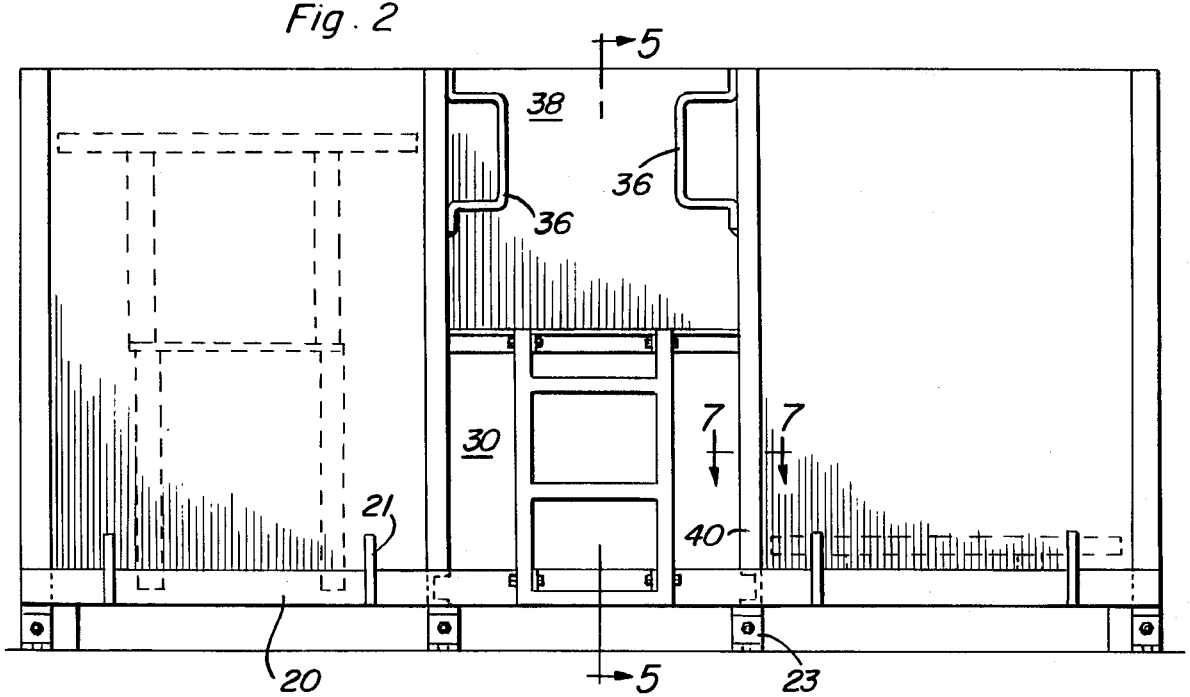
FIG. 2 is a front elevational view of the device of this invention.
Figure 3:
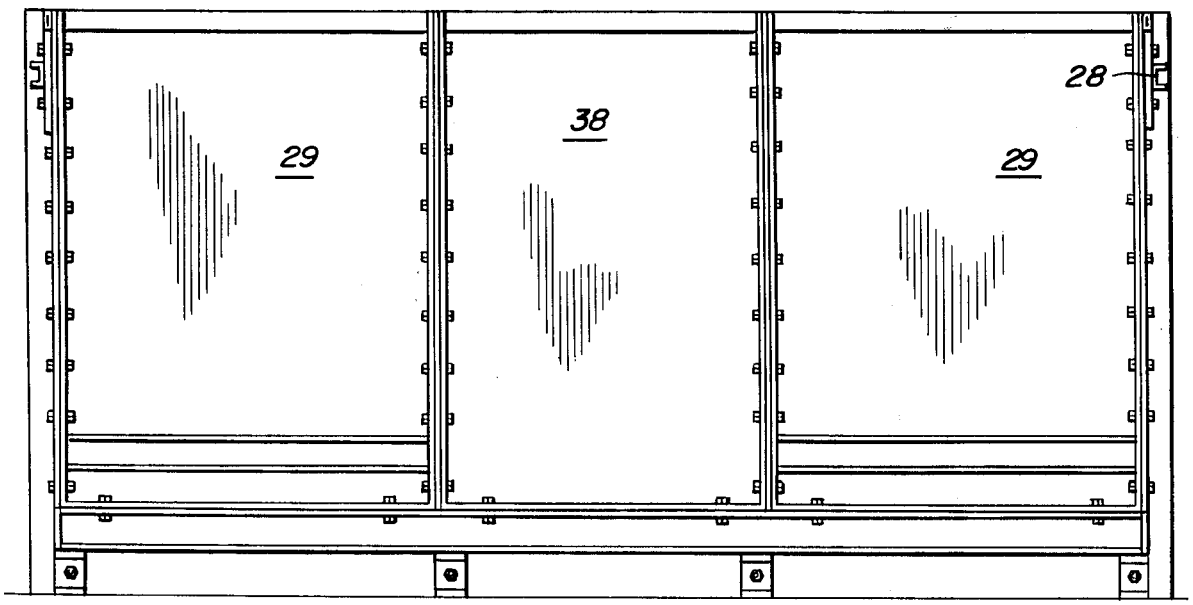
FIG. 3 is a back elevational view.

FIG. 7 shows a cross section, taken along 7—7 of FIG. 2, of the corner of the work station support platform showing one of the uprights 40 mounted from the base member 20 by welding 41 and in turn secured to horizontal angle bar 42. A U-shaped channel 44 is provided for support and retention of the front plate 30 of the operator station.

While the power cylinder 46 in FIG. 5 only indicates small connecting hoses at each end thereof, appropriate feed hoses between the controls and a source of pressure, either hydraulic or pneumatic, normally is provided for each of the power cylinders in a conventional manner.

Figure 8:
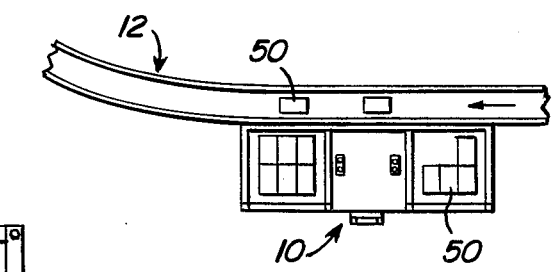
FIG. 8 is a flow diagram in block form of a typical method of use of the device of this invention.

Looking at the flow diagram of FIG. 8, the overall operation of the lifting device, indicated by 10 and as used with the conveyor 12, may be simply described. The cases of empty bottles 50 are raised by the single operator actuating the foot controls 33, and at the appropriate level which is approximately on the same plane as the top of the conveyor structure 12, the operator may easily push the upper level of cases onto the conveyor for transfer to other portions of the plant.

This overall structure, being of a single rugged arrangement which utilizes approximately 40 sq. ft. of floor space, can be easily installed at proper locations in bottling plants and the like, and will greatly increase the overall productivity and efficiency of the operator and associated system. The device reduces fatigue of the operator, eliminates the conventional-type "man handling" of the pallets, reduces glass breakage and as arranged is provided for either right-or left-hand discharge.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an apparatus for reducing manual handling and lifting of cases which are to be stacked onto and unstacked from pallets by an operator, the apparatus including at least one conveyor on which the cases are movable, the improvement comprising:

a box-like support frame open along at least one vertical face thereof, the conveyor being disposed along the opposite face thereof and adjacent to the support frame, the upper surface portions of the conveyor being disposed slightly below the upper surfaces of the frame;

first station means mounted centrally of the support frame for supporting the operator;

at least one case-receiving station means carried on one end of the frame adjacent the first station means and including a planar support member for receiving one of the pallets thereon, the planar support member being accessible through the open vertical face of the frame;

vertically extensible means disposed in the case-receiving station means for supporting and vertically displacing the planar support member; and, control means disposed on the first station means and operable by the operator for actuating the vertically extensible means, the planar support member being thus positionable to cause at least the uppermost cases stacked on the pallet located on said planar support member to be disposed immediately above the upper surfaces of the frame, whereby the operator can manually displace the cases substantially horizontally toward and into surmounting relation to the conveyor to thereby position the cases on the conveyor, cases already on the conveyor being substantionally horizontally displaceable by the operator to positions within the case-receiving station means for receipt into surmounting relation to the planar support member, lifting of the cases on movement to and from the conveyor being minimized.

2. The apparatus of claim 1 wherein the first station means comprise an elevated operator support plate, the control means comprising a foot pedal on the side of the operator support plate adjacent the case-receiving station means, the foot pedal being adapted to be operable by the operator to actuate ate the vertically extensible means.

3. The apparatus of claim 1 and further comprising a second case-receiving station means carried on the end of the frame opposite the first-mentioned case-receiving station means and adjacent the first station means, the second case-receiving station means including a second planar support member, second vertically extensible means being disposed in the second case-receiving station means for supporting and vertically displacing the second planar support member, and second control means disposed on the first station means for actuating the second vertically extensible means, the first station means comprising an elevated operator support plate, the first and second control means each comprising a foot pedal mounted respectively on the side of the operator support plate adjacent the case-receiving station means associated therewith, each foot pedal being adapted to be operable by the operator to actuate the vertically extensible means.

4. The apparatus of claim 1 and further comprising rail means mounted to the frame and extending outwardly thereof for supporting the conveyor thereon.

5. The apparatus of claim 1 wherein the vertically extensible means comprise at least one scissors jack lift mechanism disposed in supporting relation to the planar support member.

* * * * *